United States Patent
Shen et al.

(10) Patent No.: US 10,229,304 B2
(45) Date of Patent: Mar. 12, 2019

(54) FINGER DETECTION WITH AUTO-BASELINE TRACKING

(71) Applicant: Synaptics Incorporated, San Jose, CA (US)

(72) Inventors: Guozhong Shen, San Jose, CA (US); Ozan Erdogan, San Jose, CA (US); Adam L Schwartz, San Jose, CA (US); Bob Lee Mackey, San Jose, CA (US); Mandar Kulkarni, San Jose, CA (US); Ty Lien, San Jose, CA (US); Nan Wang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 472 days.

(21) Appl. No.: 14/970,236

(22) Filed: Dec. 15, 2015

(65) Prior Publication Data

US 2016/0358003 A1    Dec. 8, 2016

Related U.S. Application Data

(60) Provisional application No. 62/171,718, filed on Jun. 5, 2015.

(51) Int. Cl.
   G06K 9/00 (2006.01)
   G06F 3/041 (2006.01)
   G06F 3/044 (2006.01)

(52) U.S. Cl.
   CPC ............ *G06K 9/0002* (2013.01); *G06F 3/044* (2013.01); *G06F 3/0418* (2013.01)

(58) Field of Classification Search
   None
   See application file for complete search history.

(56) References Cited

U.S. PATENT DOCUMENTS

| 8,093,914 | B2 | 1/2012 | Maharyta et al. | |
|---|---|---|---|---|
| 2010/0177059 | A1* | 7/2010 | Wang | G06F 3/044 345/174 |
| 2011/0298745 | A1* | 12/2011 | Souchkov | G06F 3/0416 345/174 |
| 2012/0206154 | A1 | 8/2012 | Pant et al. | |
| 2012/0287077 | A1* | 11/2012 | Pant | G06F 3/044 345/174 |

(Continued)

*Primary Examiner* — Nitin Patel
*Assistant Examiner* — Amy Onyekaba
(74) *Attorney, Agent, or Firm* — Leydig, Voit & Mayer, Ltd.

(57) ABSTRACT

A device and system for automatically tracking a baseline input into a biometric sensor is provided. The device and system include a processing system with an amplifier having an input terminal and an output terminal for producing an output signal based on the input signal received by the input terminal. The processing system further includes at least one signal conditioning element coupled to the input terminal of the amplifier and configured to condition a compensation signal, and the processing system further includes a control circuit that adjusts one or more signal conditioning parameters of the at least one signal conditioning element based on the output signal of the amplifier. The at least one input signal received by the input terminal includes a combination of the at least one compensation signal and a signal from a first set of one or more receiver electrodes of the biometric sensor.

13 Claims, 12 Drawing Sheets

(56) References Cited

U.S. PATENT DOCUMENTS

| | | | |
|---|---|---|---|
| 2013/0287274 A1* | 10/2013 | Shi | G06F 3/044 382/124 |
| 2014/0267151 A1* | 9/2014 | Ryshtun | G06F 3/03545 345/174 |
| 2015/0049060 A1 | 2/2015 | Bell et al. | |
| 2015/0242054 A1* | 8/2015 | Gao | G06F 3/0418 345/174 |
| 2016/0026295 A1* | 1/2016 | Ogirko | G06F 3/0416 345/174 |
| 2016/0054829 A1* | 2/2016 | Ellis | G06F 3/044 345/178 |
| 2016/0148034 A1* | 5/2016 | Kremin | G06K 9/0002 382/124 |
| 2016/0307019 A1* | 10/2016 | Zhang | G06K 9/0002 |
| 2016/0378965 A1* | 12/2016 | Choe | G06F 21/32 726/19 |

* cited by examiner

FINGER DETECTION WITH AUTO-BASELINE TRACKING

CROSS-REFERENCE TO RELATED APPLICATIONS

This application claims priority to U.S. provisional patent application Ser. No. 62/171,718, to Gordon Shen, et al., filed on Jun. 5, 2015, entitled "FINGER DETECTION WITH AUTO-BASELINE TRACKING," the entire contents of which are herein incorporated by reference.

FIELD OF DISCLOSURE

This invention generally relates to electronic sensing, and more particularly, to capacitive fingerprint sensing.

BACKGROUND OF THE INVENTION

Biometric authentication systems are used for authenticating users of devices incorporating the authentication systems. Among other things, biometric sensing technology can provide a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Constantly scanning a fingerprint sensor array to capture an image may unnecessarily consume power when there is no corresponding fingerprint to be imaged. To minimize power consumption, a fingerprint presence detection system is sometimes used to detect the presence of a finger before entering a higher power fingerprint imaging mode.

In view of the above, there is a need for a finger presence detection system of a fingerprint sensor that provides an accurate indication of finger presence over a sensor. These and other advantages of the disclosure, as well as additional inventive features, will be apparent from the description of the disclosure provided herein.

BRIEF SUMMARY OF THE DISCLOSURE

One embodiment provides a processing system for automatically tracking a baseline input into a biometric sensor. The processing system includes an amplifier having at least one input terminal and an output terminal for producing an output signal based on at least one input signal received by the at least one input terminal. The processing system further includes at least one signal conditioning element coupled to the at least one input terminal of the amplifier and configured to condition at least one compensation signal. And the processing system further includes a control circuit that adjusts one or more signal conditioning parameters of the at least one signal conditioning element based on the output signal of the amplifier. Wherein the at least one input signal received by the input terminal includes a combination of the at least one compensation signal and a signal from a first set of one or more receiver electrodes of the biometric sensor.

Another embodiment includes an electronic system for capacitive sensing. The electronic system includes a capacitive sensor configured to capacitively sense an input object in proximity to a plurality of electrodes. Wherein the plurality of electrodes includes a first set of one or more transmitter electrodes capacitively coupled to a first set of one or more receiver electrodes and forming a first signal path for a first sensor input signal. The plurality of electrodes further includes a second set of one or more transmitter electrodes capacitively coupled to a second set of one or more receiver electrodes and forming a second signal path for a second sensor input signal with opposite phase to the first sensor input signal. The electronic system further includes a processing system configured for automatically tracking a baseline value of the first input signal and the second input signal. The processing system includes a first compensation path including a first signal conditioning element, wherein the first compensation path transmits a first compensation signal. The processing system further includes a second compensation path including a second signal conditioning element, wherein the second compensation path transmits a second compensation signal with opposite phase to the first compensation signal. The electronic system further includes an amplifier including a first input terminal, a second input terminal and an output terminal, wherein the first sensor input signal and the first compensation signal are combined into a first amplifier input signal input on the first input terminal and the second sensor input signal and the second compensation signal are combined into a second amplifier input signal input on the second input terminal, and the output terminal produces an output signal based on the first amplifier input signal and the second amplifier input signal. The electronic system further includes a control circuit configured to adjust one or more signal conditioning parameters of the first signal conditioning element and the second signal conditioning element.

Yet another embodiment includes a processing system for automatically tracking a baseline input into a sensor. The processing system includes an amplifier having at least one input terminal and an output terminal for producing an output signal based on at least one input signal received by the at least one input terminal. The processing system further includes at least one signal conditioning element coupled to the at least one input terminal of the amplifier and configured to condition at least one compensation signal. The processing system further includes a control circuit that adjusts one or more signal conditioning parameters of the at least one signal conditioning element based on the output signal of the amplifier. The processing system further includes at least one comparator configured to compare the output signal to at least one baseline threshold. Wherein the control circuit adjusts the one or more signal conditioning parameters in a first direction when the output signal is higher than the at least one baseline threshold and adjusts the one or more signal conditioning parameters in a second direction when the output signal is lower than the at least one baseline threshold. Wherein the at least one input signal received by the input terminal includes a combination of the at least one compensation signal and a signal from a first set of one or more receiver electrodes of the sensor.

BRIEF DESCRIPTION OF THE DRAWING(S)

The accompanying drawings incorporated in and forming a part of the specification illustrate several aspects of the present disclosure and, together with the description, serve to explain the principles of the disclosure. In the drawings.

Figure 1:
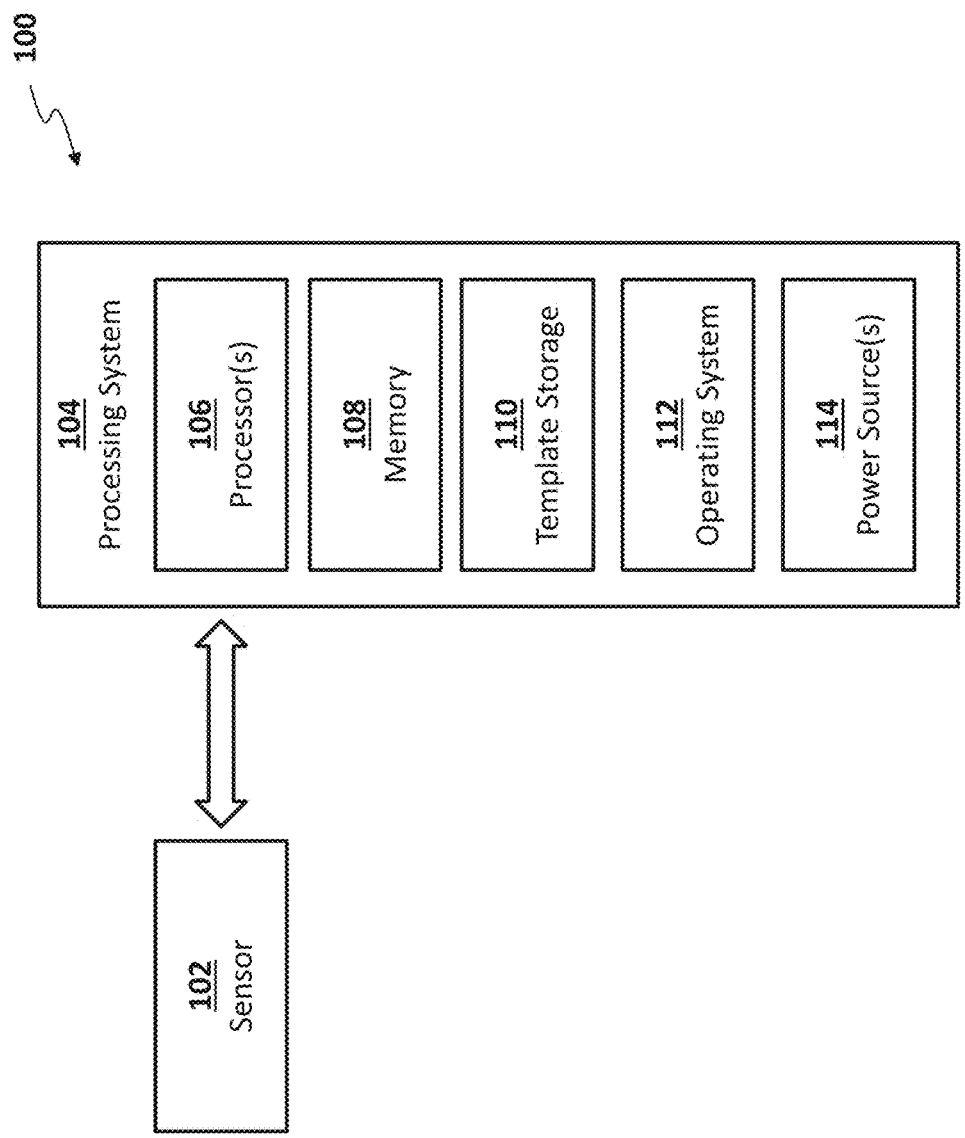
FIG. 1 is a block diagram of an exemplary system that includes an input device and a processing system, in accordance with an embodiment of the disclosure.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE DISCLOSURE

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One way to detect presence of a finger or other input object is to use one or more dedicated presence sensing elements on the input device. For example, in a fingerprint sensor, finger presence sensing electrodes may be used in addition to the electrodes of a sensing array that are used to capture an image of a fingerprint in a sensing region of the input device.

Another way to detect presence of a finger or other input object is to re-use selected sensor electrodes of the sensor array as presence sensing electrodes for presence detection. This embodiment may allow space to be saved by avoiding a need for dedicated presence sensing electrodes, as well as allowing for more accurate presence detection by using electrodes for presence detection that coincide with the sensor array.

A drawback to using presence sensing electrodes, either dedicated or not, is that typically, in certain implementations of the input device, the presence sensing electrodes may be disposed underneath a cover layer. Because the electrodes are disposed underneath the cover layer, a portion of an electric field utilized to detect the presence of an input object, such as a fingerprint when the input device is configured as a fingerprint sensor, will not be exposed outside of the cover layer. Also, this portion of the electric field not exposed outside of the cover layer will increase as a cover layer thickness increases. As such, any such signal indicating the presence of an input object will not have high gain to amplify the signal. Accordingly, a sensitivity of the input device will be affected by the thickness of the cover layer.

For example, in certain embodiments, an input device of a smart phone may include presence sensing electrodes for detecting an input object, such as a fingerprint. Regardless of whether the presence sensing electrodes are either dedicated presence sensing electrodes or selected sensor electrodes of the sensor array, the presence sensing electrodes may be disposed under a cover lens of the smart phone. As such, a portion of the electric field utilized to detect the presence of the fingerprint will not be exposed outside of the cover lens, which will reduce the sensitivity of the input device.

An additional drawback to using presence sensing electrodes for presence detection of an input object is that the sensor electrodes and their associated circuitry, such as one or more amplifiers, are exposed to temperature fluctuations within the device. As the temperature of the device changes, the output of the one or more amplifiers may be affected. This may cause drift in the output of the one or more amplifiers and make the detection of the input object more difficult.

To address the above discussed drawbacks, signal conditioning elements are added in parallel to the presence sensing electrodes. The signal conditioning elements may be added in parallel regardless of whether the presence sensing electrodes are dedicated or not. By doing so, the sensitivity of an output signal from the presence sensing electrodes will be increased such that the signal can be amplified with high gain. Further, one or more comparator devices may be implemented on the output of the presence sensing electrodes so to compare the output to threshold values in order to monitor and correct any drift experienced from temperature or other negative environmental factors.

Turning now to the figures, FIG. 1 is a block diagram of an electronic system or device 100 that includes an input device such as sensor 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include $I^2C$, SPI, PS/2, Universal Serial Bus (USB), Bluetooth, RF, and IRDA.

The device 100 may utilize any combination of sensor components and sensing technologies to detect user input in the sensing region. The device 100 comprises one or more sensing elements for detecting user input. For example, the device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" (or "trans-capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. The reference voltage may be a substantially constant voltage in various embodiments, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals).

It will be appreciated that embodiments of this disclosure are also usable in environments utilizing "self-capacitance" techniques. "Self capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments, the reference voltage may be system ground.

In certain embodiments, sensor 102 is a biometric sensor utilizing one or more various electronic sensing technologies to capture an image of a biometric pattern, such as a fingerprint, palm print, handprint, or vein pattern of a user.

In certain embodiments, the biometric sensor is a capacitive fingerprint sensor which utilizes mutual capacitance sensing techniques between sensor electrodes in a second mode to detect presence of a finger or other biometric object in a sensing area. In a fingerprint sensor embodiment, for example, upon detection of a finger, the fingerprint sensor may utilize a full array of sensor electrodes in a first mode to capture an image of a fingerprint in the sensing area using mutual capacitance or self-capacitance sensing techniques. By way of example, the sensor electrodes used to detect presence of a finger in the second mode may be separate presence sensing electrodes, or they may be a selected subset of the electrodes used to capture the image of the fingerprint.

Turning now to the processing system 104 from FIG. 1, basic functional components of the electronic device 100 utilized during capturing and storing a user fingerprint image are illustrated. The processing system 104 includes a processor(s) 106, a memory 108, a template storage 110, an operating system (OS) 112 and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Fingerprint sensors are sometimes referred to as swipe sensors or placement sensors depending on their principle of operation. Typically, swipe sensors capture an image that is larger than the sensing area by capturing a series of scans of the fingerprint as the user swipes or otherwise moves their finger over the sensing area. A processing system then reconstructs the scans into a larger swipe image. Since the image is reconstructed from a series of scans, this allows the sensing array to be made small, such as a small two-dimensional array or even as small as a single linear array, while still capturing a series of scans that can be reconstructed into a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Figure 2:
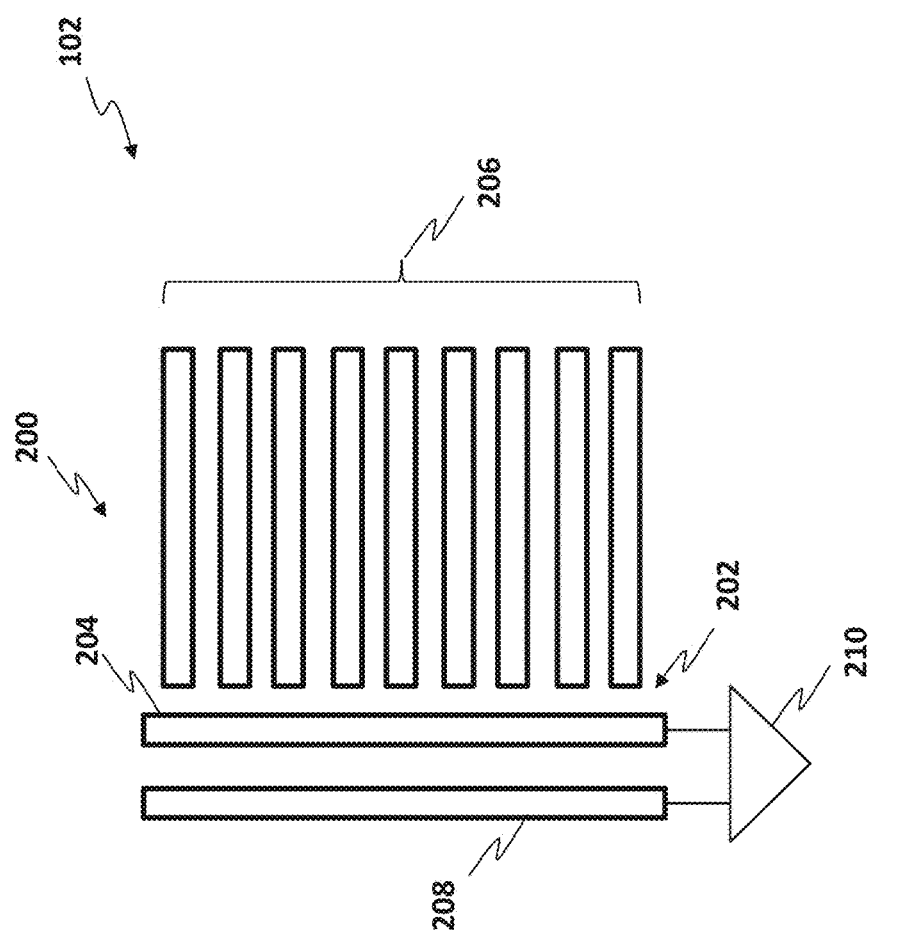
FIG. 2 is a schematic view of a capacitive sensor, in accordance with an embodiment of the disclosure.
Figure 3A:
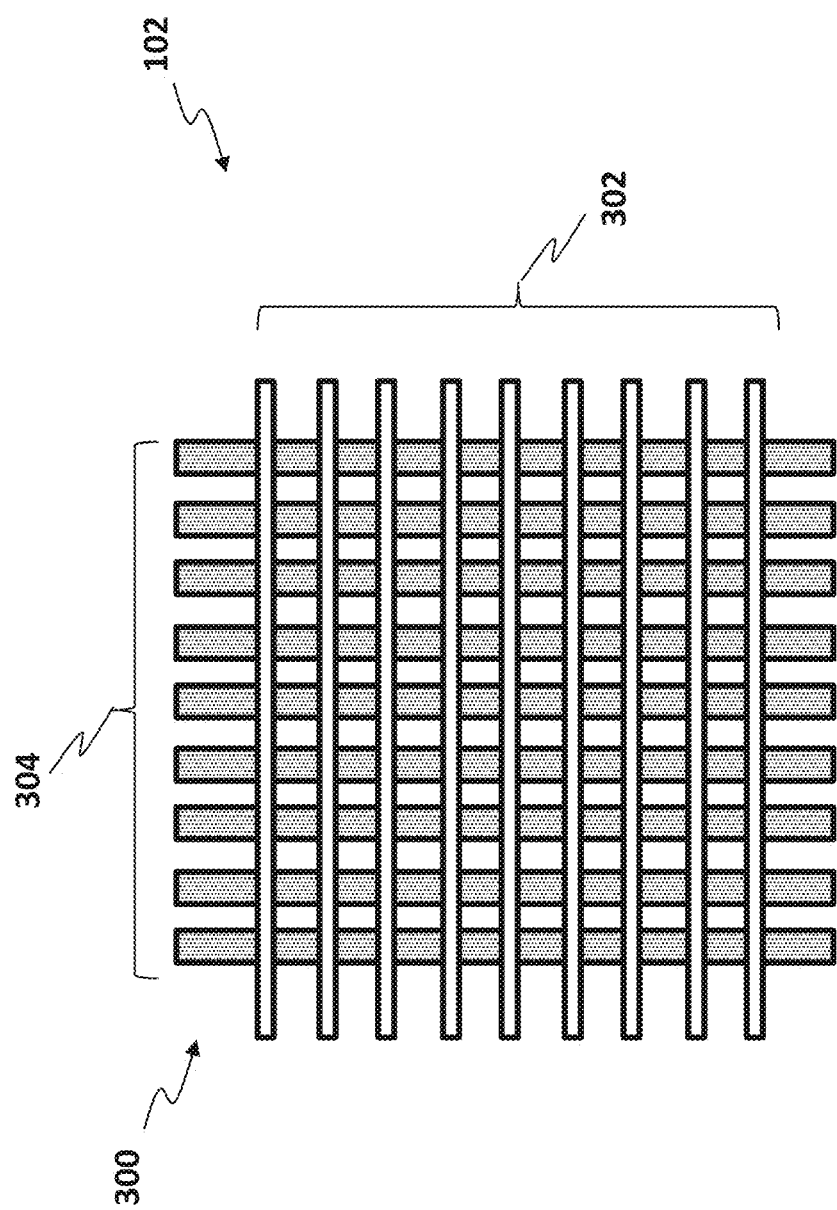
FIG. 3A is a schematic view of a capacitive sensor, in accordance with an embodiment of the disclosure.
Figure 3B:
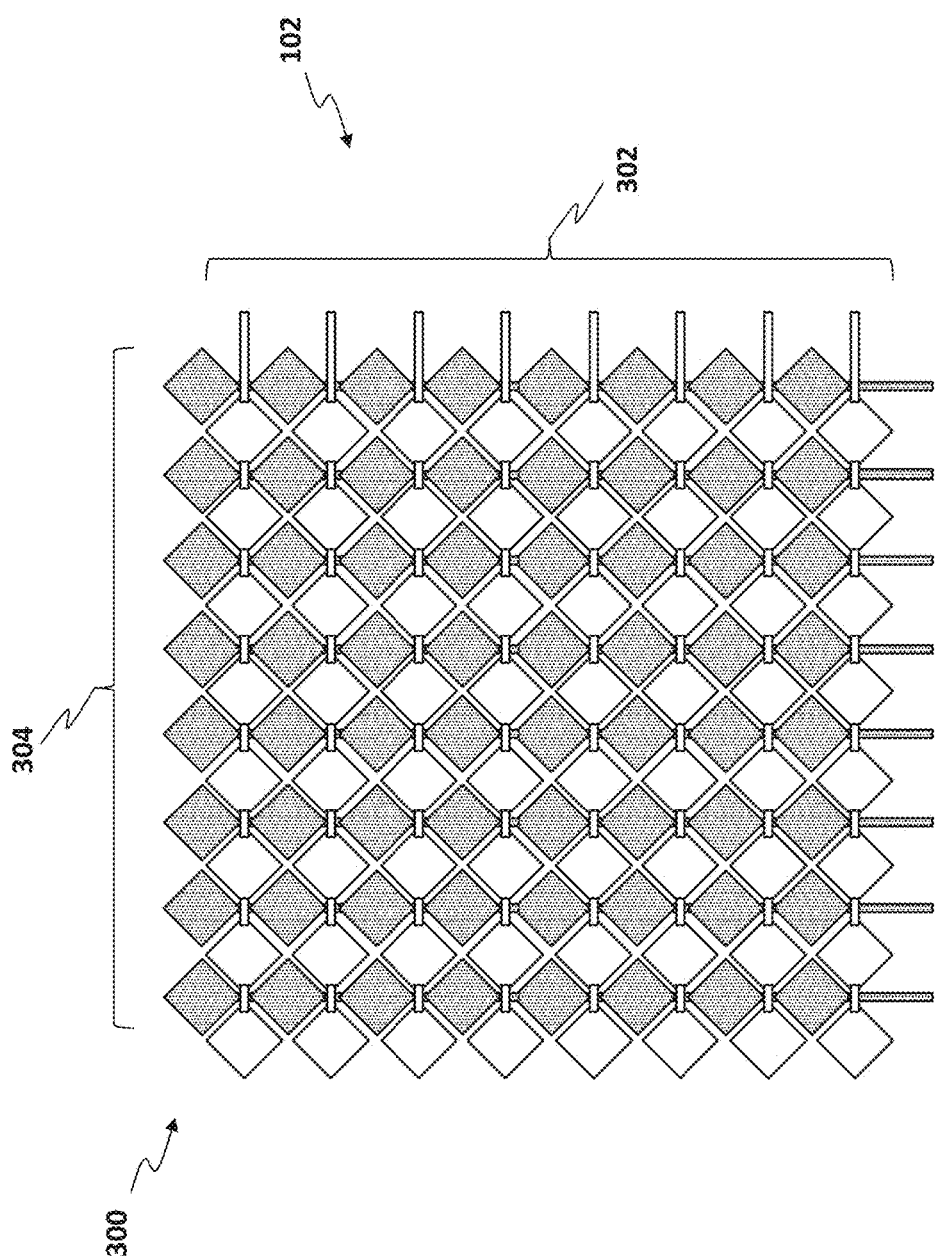
FIG. 3B is a schematic view of a capacitive sensor, in accordance with an embodiment of the disclosure.

FIGS. 2-3B illustrate exemplary embodiments of the sensor 102 in accordance with the disclosure contained herein. FIG. 2 illustrates an embodiment of the sensor 102 configured as a capacitive sensor that includes a plurality of electrodes 200, including a set of transmitter electrodes 206 and a receiver electrode 204, arranged in a linear one dimensional capacitive gap array. A pixel is formed at the capacitive coupling between each of the transmitter electrodes 206 and the receiver electrode 204. In the depicted embodiment, the sensor electrodes 200 are operated in a first mode to capture an image of a fingerprint by driving transmitter signals onto each of the transmitter signals 206, and detecting resulting signals at the receiver electrode 204 that correspond to the transmitter signals. In one implementation, the transmitter signals are driven onto each of the transmitter electrodes 206 one at a time, in a sequence one after another. In another implementation, transmitter signals are driven onto multiple transmitter electrodes simultaneously, using a code division multiplexing (CDM) or time-division multiplexing (TDM) sensing scheme.

Additionally, in the embodiment illustrated in FIG. 2, a reference receiver electrode 208 is illustrated. The reference receiver electrode 208 is located farther away from the transmitter electrodes 206 and is utilized as a reference to a differential measurement, such that noise is rejected at a differential output into differential amplifier 210. Additionally, while the embodiment illustrated in FIG. 2 shows only a single linear sensor array for imaging a sensing area in the first mode, it is possible to utilize an additional linear array with a corresponding receiver electrode and set of transmitter electrodes, which can be correlated to the illustrated linear array to assist with image reconstruction.

In certain embodiments of the sensor 102 of FIG. 2, the sensor electrodes 200 may also be operated in a second mode. In the second mode, transmitter signals are driven onto one or more selected transmitter electrodes of the transmitter electrodes 206, and resulting signals corresponding to the transmitter signals are detected at a set of one or more other transmitter electrodes selected from the set of transmitter electrodes 206. In this mode, it is possible to detect mutual capacitance between parallel extending electrodes by operating one or more selected transmitter electrodes as receivers, which may be useful to detect presence of a finger over the sensor, among other uses. This may also allow the presence of the finger or another input object to be detected with less power consumption than used in imaging with the full sensor array 102 in the first mode.

In the illustrated embodiment, the transmitter electrodes 206 and the receiver electrode 204 are coplanar with each other, and an array of pixels are formed at the array of capacitive gaps 202 between the ends of each transmitter electrode 206 and the receiver electrode 204. In another embodiment, the receiver electrode 204 and the transmitter electrodes 206 are configured to overlap, and the receiver electrode 204 and transmitter electrodes 206 are formed in the same or separate substrates separated by an insulator at each location where they overlap.

Moreover, while the illustrated embodiment depicts a plurality of transmitter electrodes 206 coupled to a common receiver electrode 204 to form a sensor array, in another embodiment, it is possible to use a similar construction having the receiver electrodes and transmitter electrodes reversed, so that a plurality of receiver electrodes are capacitively coupled to a common transmitter electrode to form the sensor array.

FIGS. 3A-3B illustrate additional embodiments of sensor 102. As shown, sensor 102 is configured as a capacitive sensor that includes a plurality of electrodes 300 which form a two-dimensional array of pixels. In the sensor 102 of FIGS. 3A-3B, rows of receiver electrodes 302 overlap columns of transmitter electrodes 304 to form a pixel based on a capacitive coupling at each overlap location. In one implementation, the receiver electrodes 302 and transmitter electrodes 304 are formed on the same substrate. In another implementation, they are formed on different substrates. In either case, some dielectric may separate the set of transmitter electrodes 304 and the set of receiver electrodes 302 at each overlap location, and one of the sets may be closer to a sensing area where a finger or other object is placed. In one implementation, the receiver electrodes 302 are disposed closer to a sensing area of the capacitive sensor 102, and selected receiver electrodes are operated in a low power mode to detect a presence of a finger.

In the embodiment illustrated in FIG. 3A, the transmitter electrodes 304 and receiver electrodes 302 are depicted as sets of bars and stripes, respectively. The transmitter electrodes 304 each extend parallel to each other, and the receiver electrodes 302 also extend parallel to each other, in a different direction from the transmitter electrodes to form a two-dimensional array of pixels. In the illustrated embodiment, the transmitter electrodes and receiver electrodes extend perpendicular to each other. The transmitter electrodes and receiver electrodes may be formed, for example, on separate respective substrates, or opposing sides of the same substrate, and in either case the substrate material may separate the transmitter electrodes 304 and receiver electrodes 302 to form capacitive gaps between them at each overlap location.

In the embodiment illustrated in FIG. 3B, the transmitter electrodes 304 and receiver electrodes 302 are depicted as forming a diamond sensor pattern. In this embodiment, rows of receiver electrodes overlap columns of transmitter electrodes. Specifically, each of the transmitter electrodes 304 is made up of a set of interconnected diamonds, and each of the transmitter electrodes extends parallel to each other. Similarly, each of the receiver electrodes 302 is made up of a set of interconnected diamonds, and each of the receiver electrodes extends parallel to each other, perpendicular to the transmitter electrodes. In the illustrated embodiment, the receiver electrodes overlap the transmitter electrodes at narrower portions along the length of each electrode. The diamond sensor pattern of FIG. 3B may be formed in a variety of ways. For example, the receiver electrodes and transmitter electrodes may be formed in the same layer, on the same side of an insulating substrate. Small amounts of dielectric may be used over the narrower portions of the transmitter electrodes 304, so that the diamonds of each receiver electrode can be interconnected with conductive material over the transmitter electrodes, without creating ohmic contact between the receiver electrodes and transmitter electrodes. The diamond pattern may also be formed with the receiver electrodes and transmitter electrodes on separate substrates, or opposing sides of the same substrate, as described above.

It will be appreciated that other sensor array patterns are possible without departing from the principles described herein. For example, other electrode shapes besides diamond patterns, bars, and stripes are possible without departing from certain principles described herein. Similarly, other electrode orientations besides perpendicular rows and columns are possible without departing from certain principles described herein. It will also be appreciated that transmitter signals can be driven onto each of the transmitter electrodes 304 and resulting signals can be detected at each of the receiver electrodes 302 using a variety of modulation schemes in order to capture an image of the sensing area. In one implementation, the transmitter signals are driven onto each of the transmitter electrodes 304 one at a time, in a sequence one after another. In another implementation, transmitter signals are driven onto multiple transmitter electrodes simultaneously and/or resulting signals are detected at each of the receiver electrodes simultaneously, using a code division multiplexing (CDM) or time-division multiplexing (TDM) sensing scheme.

Figure 4:
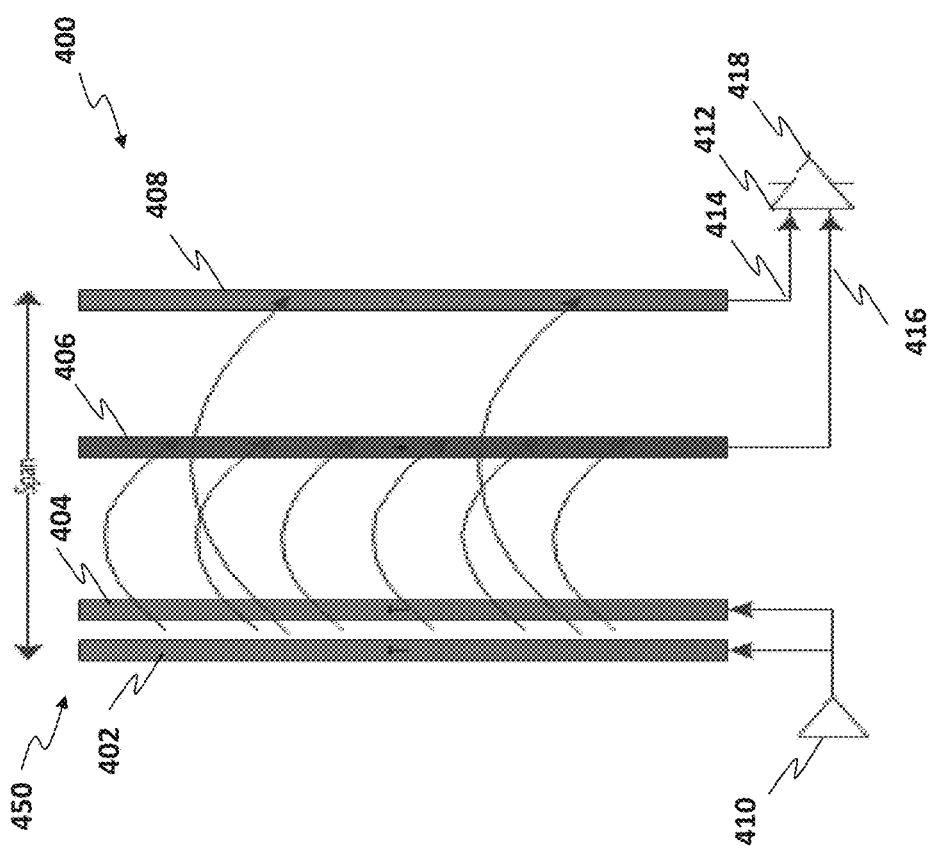
FIG. 4 is a schematic view of a capacitive sensor configured to provide presence detection functionality, in accordance with an embodiment of the disclosure.
Figure 5:
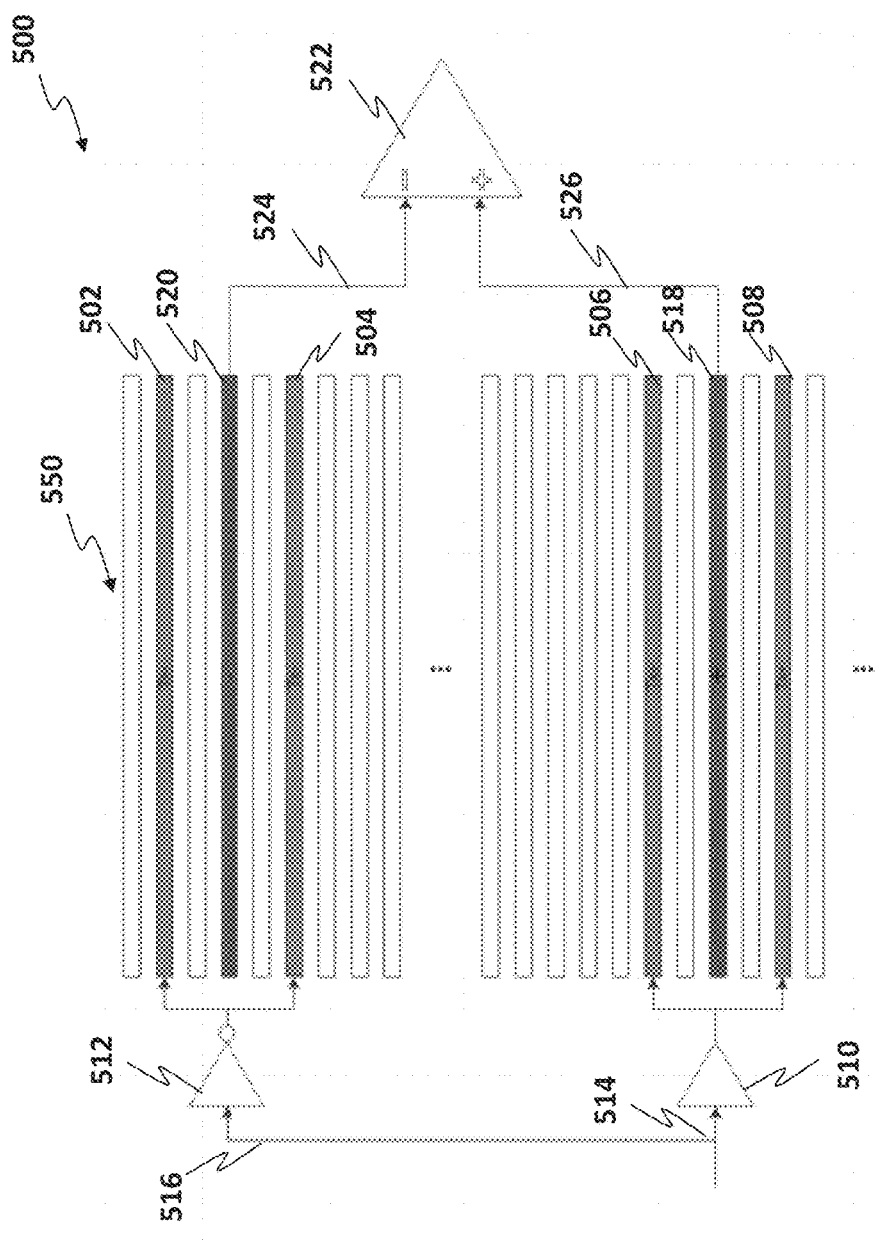
FIG. 5 is a schematic view of a capacitive sensor configured to provide presence detection functionality, in accordance with an embodiment of the disclosure.

Turning now to FIGS. 4 and 5, arrangements of electrodes and associated circuitry utilized for presence detection of an input object, such as a finger, are illustrated. In various embodiments, the electrodes and circuitry may be arranged in a single end drive configuration, such as that shown in FIG. 4, or in a differential drive configuration in which opposite phase transmitter signals are driven onto separate electrodes, such as that shown in FIG. 5. Also, in either case the electrodes and circuitry may be arranged to take a single end measurement (not pictured), or may be arranged to take a differential measurement, as shown in both FIGS. 4 and 5.

In one embodiment, the illustrated electrode and circuit arrangements may depict a selected subset of electrodes 200, 300 from the sensor 102 re-used for finger presence detection, in accordance with principles described herein. In another embodiment, the electrode and circuit arrangements of FIGS. 4 and 5 may depict dedicated electrodes utilized for finger presence detection, in accordance with principles described herein. Regardless of whether the arrangement of electrodes and the associated circuitry is configured to re-use selected sensor electrodes from sensor 102 or are dedicated for finger presence detection and separate from the sensor 102, the techniques and principles disclosed herein and described in relation to FIGS. 4-11 are applicable.

Moreover, FIGS. 4 and 5 depict the electrodes as parallel bars/stripes. However, it will be appreciated that the techniques described herein can also be applied to parallel diamond shaped electrodes, e.g., as shown in FIG. 3B, or other sensor patterns, without departing from the scope of the principles described therein.

FIG. 4 illustrates a capacitive sensor 400 configured for finger presence detection. The capacitive sensor 400 includes electrodes and circuitry arranged in a single end drive configuration and configured to take a differential measurement. In this regard, transmit electrodes Tx 402 and 404 are driven with a transmitter signal from a single transmitter 410, and receive electrodes Rx+ 406 and Rx− 408 are configured to detect resulting signals. In the illustrated embodiment, the single end drive signal is driven onto two electrodes, Tx 402 and 404 for signal enhancement, and the receive electrodes also include two electrodes, Rx+ 406 and Rx− 408. However, in different implementations, it is possible to drive and/or detect on more or fewer electrodes, e.g., based on the dimensions of the sensor pattern and the electric fields extending above the sensor pattern that can be affected by a finger touch.

Receive electrodes Rx+ 406 and Rx− 408 are configured to detect resulting signals corresponding to the transmitter signal driven onto Tx 404 and Tx 402. The resulting signals are provided to an amplifier 412 with Rx+ 406 connected to a positive input 416 of the amplifier 412 and Rx− 408 connected to a negative input 414 of the amplifier 412. Additionally, in the illustrated embodiment, Rx+ 406 is closer than Rx− 408 to the electrodes Tx 402 and 404 that are driven with the transmitter signal. This arrangement generates an imbalanced differential signal provided to the amplifier 412. This imbalanced signal has the beneficial effect of removing more noise from the differential measurement being performed by the amplifier 412 compared to a single end measurement (not pictured). In this configuration, common mode noise coupled onto Rx+ 406 and Rx− 408 is removed in output 418 of the amplifier 412.

Accordingly, output 418 is a low noise gain signal that correlates to an amount of energy capacitively coupled from Tx 402 and 404 to Rx+ 406. The amount of energy coupled from Tx− 402 and 404 to Rx+ 406 is affected by the presence of a biometric object such as a fingerprint. When a biometric object is present in the sensing area of a capacitive sensor 400, the output 418 will be less in value than when no biometric object is present. In this regard, the output 418 of the capacitive sensor 400 can be utilized for finger presence detection.

Turning now to FIG. 5, a capacitive sensor 500 that provides finger presence detection is illustrated, according to a particular embodiment. In this embodiment, the capacitive sensor includes electrodes and circuitry arranged in a differential drive configuration and configured to take a differential measurement. The capacitive sensor 500 includes an electrode arrangement 550, which includes one or more transmitter electrodes selected to transmit input signals and further includes one or more receiver electrodes selected to receive the input signals from the transmitter electrodes. In the illustrated embodiment, transmitter signals are driven onto at least four electrodes, illustrated as a first Tx− 502, a second Tx− 504, a first Tx+ 506 and a second Tx+ 508. The pair of electrodes Tx− 502 and 504 are driven with transmitter signals having opposite phase to the pair of electrodes Tx+ 506 and 508. In addition, the electrodes Rx− 520 and Rx+ 518 are disposed between their respective pairs of electrodes driven with transmitter signals. Specifically, Rx− 520 is disposed between the first Tx− 502 and the second Tx− 504, and Rx+ 518 is disposed between the first Tx+ 506 and the second Tx+ 508.

FIG. 5 further illustrates a first transmitter 510 and a second transmitter 512 arranged in a differential drive configuration. The first transmitter 510 couples a first transmit signal 514 onto the first Tx+ 506 and the second Tx+ 508, and the second transmitter 512 couples a second transmit signal 516 that is similar to the first transmit signal but with opposite phase onto the first Tx− 502 and the second Tx− 504. In the illustrated embodiment, the second transmitter 512 is configured as an inverter. Because there are two transmit electrodes for each receive electrode, the first resulting signal level provided to a positive input path 526 and the second resulting signal level provided to a negative input path 524 of an amplifier 522 are typically greater relative to a signal level that would be achieved if each opposite phase signal were driven onto only a single electrode. Further, since differential drive is used and the inputs to the amplifier correspond to receiver signals that result from the opposite phase transmitter signals, further signal enhancement may be achieved compared to a single-end drive implementation, as illustrated in FIG. 4.

An output of the amplifier 522 is a differential measurement between the first resulting signal and the second resulting signal and results in a low noise gain signal that correlates to an amount of energy capacitively coupled from Tx− 502 and 504 to Rx− 520 and from Tx+ 506 and 508 to Rx+ 518. The amount of energy coupled from Tx− 502 and 504 to Rx− 520 and from Tx+ 506 and 508 to Rx+ 518 is affected by the presence of a biometric object such as a finger. When a biometric object is present at the capacitive sensor 500, the output of the amplifier 522 will be less in value than when no biometric object is present. In this regard, the output of the capacitive sensor 500 can be utilized to detect for the presence of a biometric object, such as a finger.

Regardless of whether a single end drive configuration, such as that shown in FIG. 4, or a differential drive configuration, such as that shown in FIG. 5, is utilized for finger presence detection, the output of the capacitive sensor 400, 500 is compared to a threshold signal level to determine if the processing system 104 may maintain operation of the capacitive sensor 102 and the device 100, in general, in the second mode (i.e., low power) or return operation to the first mode (i.e., higher power).

As discussed above, the transmitter 410 and amplifier 418 in the single end drive embodiment of FIG. 4 and transmitters 510 and 512 and amplifier 522 in the differential drive embodiment of FIG. 5 are exposed to environmental conditions within the device 100, such as temperature fluctuations. For instance, as the temperature of the device 100 changes, the output of the amplifiers 418 or 522 may be affected. In certain embodiments, the threshold used to determine the presence of the biometric object is set in reference to a baseline output of the amplifier 418 or the amplifier 522 when the biometric object is not present at the capacitive sensor 400, 500. As such, the environmental conditions within the device 100 may cause unwanted changes in this baseline output. Accordingly, unwanted changes in the baseline output may cause false readings provided by the capacitive sensor 400, 500. A false reading from the capacitive sensor 400, 500 may cause the device 100 to improperly wake up the device 100 and/or return the sensor 102 to the first mode (i.e., higher power) even when a biometric object is not present at a sensing region of the capacitive sensor 400, 500.

Figure 6:
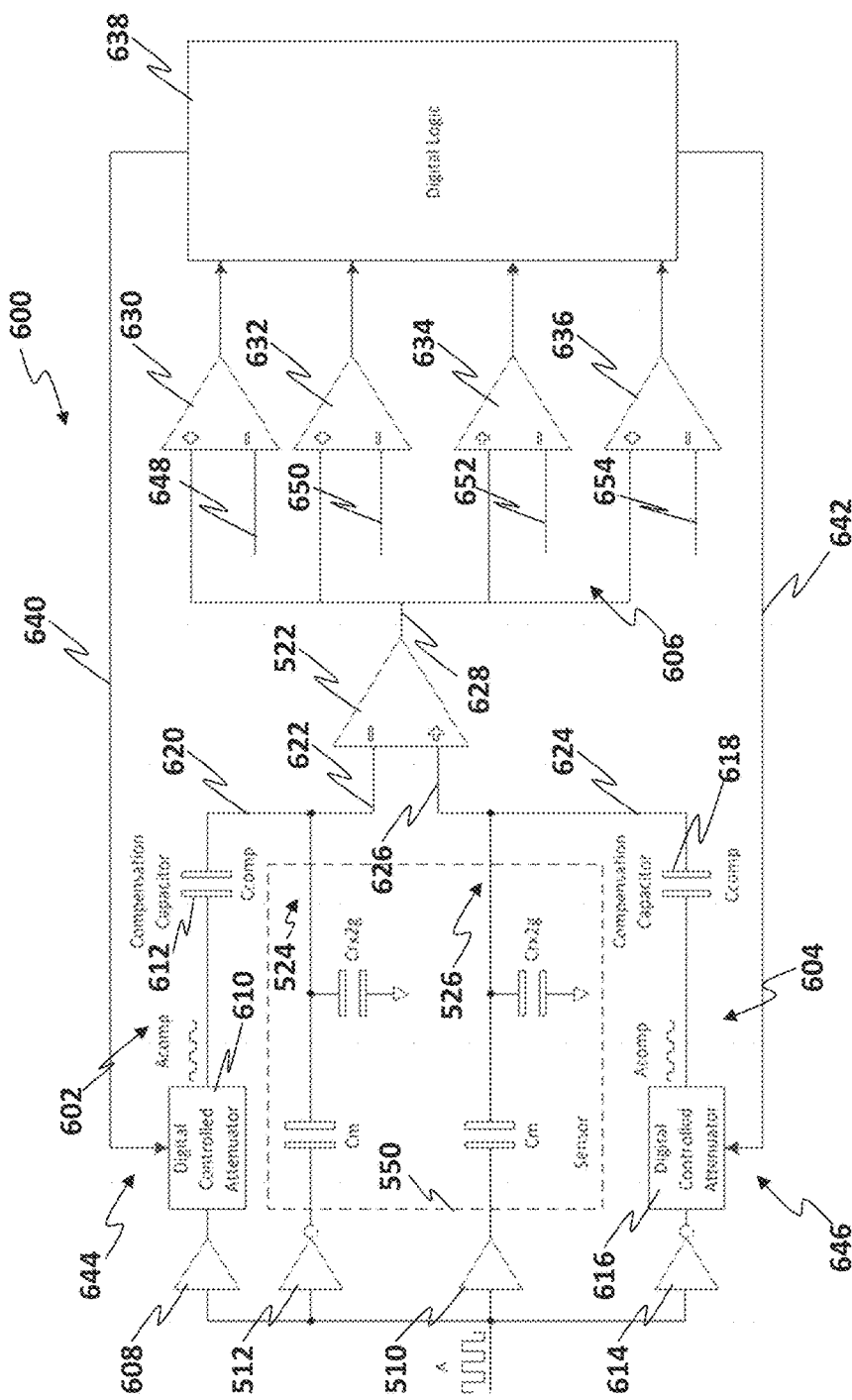
FIG. 6 is a schematic view of a capacitive sensor with auto-baseline tracking, in accordance with an embodiment of the disclosure.

Techniques and principles disclosed herein and described in relation to FIGS. 6-11 provide for tracking any unwanted changes in the baseline output of the capacitive sensor 400, 500 to avoid improper finger presence detection functionality. Turning now to FIG. 6, a sensor circuit 600 with auto-baseline tracking functionality is illustrated according to an embodiment of the disclosure. The sensor circuit 600 compensates for any drift in the output of the finger presence detection system of the device 100, and may be implemented as part of various types of finger presence sensing systems. For instance, the sensor circuit 600 may be implemented in a presence sensing system using dedicated electrodes separate from the sensor 102 (see FIG. 1), or the sensor circuit 600 may be implemented in a presence sensing system that re-uses selected sensor electrodes of the sensor 102. Further, various components of the sensor circuit 600 may be implemented as part as the processing system 104.

In the illustrated embodiment, the sensor circuit 600 is shown as being implemented with the capacitive sensor 500 (see FIG. 5) and includes the electrode arrangement 550 illustrated in circuit diagram form. As illustrated, the electrode arrangement 550 includes two input paths, the negative input path 524 (see FIG. 5) driven by the second transmitter 512 and the positive input path 526 driven by the first transmitter 510. Regarding the negative input path 524, capacitor Cm represents a capacitance between the receive electrode Rx− 520 and the two transmit electrodes, Tx− 502, 504, and capacitor Crx2g represents a capacitance between Rx− 520 and ground. Regarding the positive input path 526, capacitor Cm simulates a capacitance between the receive electrode Rx+ 518 and the two transmit electrodes, Tx+ 506, 508, and capacitor Crx2g represents a capacitance between Rx+ 518 and ground.

In the illustrated embodiment, sensor circuit 600 further includes a first compensation path 602 and a second compensation path 604. While the illustrated embodiment shows two compensation paths, the disclosure contemplates greater or fewer compensation paths. Generally, for each input path, such as input paths 524 and 526, discussed above, there will be a corresponding compensation path. However, this one-to-one relationship is not required, in as much as in certain embodiments, some subset of inputs may not include a corresponding compensation path.

As illustrated, compensation paths 602 and 604 include a respective transmitter 608 and 614 for driving a baseline input signal onto the compensation paths 602 and 604. The baseline input signal may be similar to the first and second transmit signal 514 and 516 (see FIG. 5). Transmitter 608 drives the baseline input signal, or just input signal, onto the first compensation path 602. The input signal is similar to the input signal provided by transmitter 512 but with opposite phase. Transmitter 614 drives the input signal onto the second compensation path 604. The input signal provided by transmitter 614 is similar to the input signal provided by the transmitter 610 but with opposite phase.

Compensation path 602 includes one or more signal conditioning elements 644, and compensation path 604 includes one or more signal conditioning elements 646. Generally, signal conditioning elements 644 and 646 can include any element or device that will function to condition the baseline input signal driven by transmitter 608 or transmitter 614. For instance, as a nonexhaustive list of devices, the one or more signal conditioning elements 644 and 646 may each include any combination of one or more of a capacitor, a variable capacitor, an attenuator such as a digitally controlled attenuator, and a digital-to-analog converter (DAC). In embodiments of the disclosure where the signal conditioning elements 644 and 646 include a DAC, the transmitters 608 and 614 may optionally be removed from the sensor circuit 600.

Further, each signal conditioning element includes one or more signal conditioning parameters. Signal conditioning parameters are either variable settings for the signal conditioning elements or an intrinsic property of the signal conditioning element. For instance, signal conditioning parameters for a capacitor may include a capacitance and phase of the capacitor. Similarly, signal conditioning parameters for a variable capacitor will include a variable capacitance and phase. Signal conditioning parameters for an attenuator may include a resistance or a variable resistance for a digitally controlled attenuator. Also, signal conditioning parameters for a DAC may include any DAC settings that control an output magnitude of the DAC.

In the illustrated embodiment, the signal conditioning elements 644 include a digitally controlled attenuator 610 and a compensation capacitor 612, and signal conditioning elements 646 include a digitally controlled attenuator 616 and a compensation capacitor 618. Accordingly, in the illustrated embodiment, the signal conditioning parameters for both the signal conditioning elements 644 and 646 include an attenuation factor for the digitally controlled attenuators 610 and 616 and a capacitance and phase of the compensation capacitors 612 and 618.

The output of the compensation path 602 results in a compensation signal 620, and the output of the compensation path 604 results in a compensation signal 624. Compensation signal 620 is a version of the input signal from the transmitter 608 but conditioned by the one or more signal conditioning elements in the compensation path 602. Compensation signal 624 is a version of the input signal from the transmitter 614 but conditioned by the one or more signal conditioning elements in the compensation path 604.

In the illustrated embodiment, sensor circuit 600 includes an amplifier 522 that takes a differential measurement and produces an amplified output signal. The amplifier 522 includes a negative input 622, which receives a combination of the compensation signal 620 and a signal present on the negative input path 524 (see FIG. 5). The amplifier 522 further includes a positive input 626, which receives a combination of the compensation signal 624 and a signal present on the positive input path 526 (see FIG. 5). Based on the combination of the signal present on the negative input path 524 and the compensation signal 620 and the combination of the signal present on the positive input path 526 and the compensation signal 624, the amplifier 522 generates an output signal 628.

Additionally, in the illustrated embodiment, as arranged, the compensation capacitor 612 will function to subtract a portion of a voltage of the input signal of the negative input path 524, and the compensation capacitor 618 will function to subtract a portion of a voltage of the input signal of the positive input path 526. In embodiments where the sensor circuit 600 is implemented underneath a cover layer, such as a cover glass layer of a display, the input signal of both the negative input path 524 and the positive input path 526 generate an electric field in the electrode arrangement 550. Due the electrode arrangement being implemented underneath the cover layer, only a portion of the electric field is exposed beyond the cover layer. Accordingly, that portion of the electric field not exposed beyond the cover layer is subtracted out by the compensation capacitors 612 and 618 in conjunction with their respective attenuators 610 and 616, thereby allowing a high gain to be applied by amplifier 522.

The above discussion of a voltage of the input signal entering the amplifier 522 can be represented with a voltage equation. As an example, for the illustrated embodiment of FIG. 6, the following equation (1) can be used to determine the voltage entering the amplifier 522.

$$V_{in} = 2(A*Cm - A\text{comp}*C\text{comp})/Crx2g \quad (1)$$

In the above equation (1), it is assumed that the magnitude of Cm and Crx2g for both the negative input path 524 and the positive input path 526 are equal. A is the amplitude of the input signal transmitted by each of the transmitters 608, 512, 510 and 614, where the amplitude of the input signal from each transmitter is assumed to be equal to simplify the above equation (1). Cm is the value of the capacitance between the receive electrode Rx+ 518 and the two transmit electrodes, Tx+ 506, 508 (see FIG. 5) or the capacitance between the receive electrode Rx− 520 and the two transmit electrodes, Tx− 502, 504, where both Cm are assumed to be equal to simplify the above equation (1). Acomp is an amplitude of the signal into the compensation capacitor 612 after the attenuator 610, or the amplitude of the signal into the compensation capacitor 618 after the attenuator 616, where both Acomp are assumed to be equal values to simplify the above equation (1). Ccomp is the capacitance of either the compensation capacitor 612 or compensation capacitor 618, wherein both Ccomp are assumed to be equal to simplify the above equation (1). Crx2g is the capacitance between Rx+ 518 and ground or Rx− 520 and ground, where both Crx2g are assumed to be equal to simplify the above equation (1). As can be seen in the above equation, the Acomp*Ccomp portion is subtracted from the A*Cm portion. Accordingly, in embodiments where sensor circuit 600 is implemented underneath a cover layer, this subtraction of Acomp*Ccomp from A*Cm increases the sensitivity of the output signal 628 by applying a high gain only to the portion of the electric field of the electrode arrangement 550 exposed beyond the cover layer.

As an aside, the above discussion regarding the equation (1) can be modified for other types of signal conditioning elements 644 and 646. For instance, in certain embodiments, the compensation capacitors 612 and 618 could be replaced by variable capacitors, and the digitally controlled attenuators 610 and 616 could be replaced by another type of attenuator or a DAC. Further, a first DAC could replace both the compensation capacitor 612 and the digital controlled attenuator 610 for the compensation path 602, and a second DAC could replace both the compensation capacitor 318 and the digital controlled attenuator 616 for the compensation path 604. In doing so, equation (1) would need to be modified to represent the actual signal conditioning elements utilized.

The sensor circuit 600 includes a comparator network 606, which includes one or more comparators that receive the output 628 and compare it to a threshold value. The embodiment of the sensor illustrated in FIG. 6 includes four operational amplifiers, each arranged as an individual comparator 630, 632, 634 and 636. Each positive input of each comparator 630, 632, 634 and 636 receives the output signal 628 and compares it to a threshold value. The comparator 630 receives the output signal 628 at its positive terminal and receives an error threshold 648 at its negative terminal for indicating when an error occurs in sensor circuit 600. The comparator 632 receives the output signal 628 at its positive terminal and receives a high baseline threshold 650 at its negative terminal for indicating when the output signal 628 crosses the high baseline threshold. The comparator 634 receives the output signal 628 at its positive terminal and receives a low baseline threshold 652 at its negative input for indicating when the output signal 628 crosses the low baseline threshold 652. The comparator 636 receives the output signal 628 at its positive terminal and receives a presence threshold 654 at its negative terminal for indicating when an object, such as a biometric object (fingerprint), is present on a sensing area of the sensor circuit 600.

The high baseline threshold 650 is a boundary value on the high side indicating when the output signal 628 may be drifting higher than desired, and the low baseline threshold 652 is a boundary value on the low side indicating when the output signal 628 may be drifting lower than desired. The presence threshold 654 is a threshold value indicating the presence of an object on a sensing area of the sensor circuit 600. As such, if the output signal 628 decreases below the presence threshold 654, then the sensor circuit 600 will indicate that the biometric object is present. The error threshold 648 is set at a level above which the output signal 628 will typically reach during normal operation. Accordingly, if the output signal 628 goes above the error threshold 648, the sensor circuit 600 will indicate the occurrence of an error.

It will be appreciated that the output signal 628 does not have to be provided to the positive input of the comparators 630, 632, 634 and 636. In another embodiment, the output signal 628 could be provided to the negative inputs of the comparators 630, 632, 634 and 636, and the positive input could receive the associated threshold.

Additionally, each comparator of the comparator network 606 is configured to sample the output signal 628 with a certain sampling period or window. This sampling window can be wide enough so as to ensure capturing of a peak or valley of the output signal 628.

The sensor circuit 600 further includes a control circuit 638. The control circuit may be implemented as digital logic, as illustrated in FIG. 6. The digital logic 638 receives each output from the comparator network 606. Based on the outputs of the comparator network 606, the digital logic 638, via connections 640 and 642, will adjust variable signal conditioning parameters from certain signal conditioning elements of each compensation path 602 and 604. In this regard, the digital logic 638 can tune the output signal 628 such that it remains within the boundary set by the high baseline threshold 650 and the low baseline threshold 652 input into comparators 632 and 634, respectively. In situations where the object, such as a biometric object like a fingerprint, is present at the sensing region of the sensor circuit 600, the output signal 628 will exceed the presence threshold 654 at the comparator 636 and the digital logic 638 will indicate that the object is present. Further, if the output signal 628 exceeds the error threshold 648, then the digital logic 638 will indicate the occurrence of an error.

In an alternative embodiment, rather than adjusting the signal conditioning parameters, the digital logic 638 could set the error and presence thresholds 648, 654 according to the changing output signal 628. In this embodiment, a difference between a baseline value of the output signal 628, determined when the object is not present at the sensor circuit 600, and the error and presence thresholds 648, 654 would be maintained by changing the error and presence thresholds 648, 654. Accordingly, when the object is present at the sensor circuit 600, the sensor circuit 600 would still indicate the presence of the object.

Generally, the digital logic 638 adjusts the compensation signals slower than the comparator 630 or comparator 636 indicating that the output signal 628 has crossed one of the error or presence thresholds 648, 654. In this manner, the digital logic will be able to correct movement in the baseline input signal when the object is not present but not affect sensor circuit 600 from being able to detect the presence of the object at the sensor circuit 600.

Further, in certain embodiments, the digital logic 638 can adjust the various signal conditioning parameters independently between the compensation path 602 and the compensation path 604. Accordingly, in these embodiments, the digital logic 638 can condition the output signal 628 in a variety of ways in order to have the output signal 628 closely track the desired baseline level.

In the illustrated embodiment, the digital logic 638 can adjust the attenuation factor of the digitally controlled attenuator 610 by using connection 640 and can adjust the attenuation factor of the digitally controlled attenuator 616 by using the connection 642. In other embodiments, the digital logic 638 may adjust signal compensation parameters for a variable capacitor and/or a DAC in a similar manner. Regardless, the digital logic 638 is able to adjust a level of the output signal 628 by adjusting the signal compensation parameters of the signal conditioning elements 644 and 646 such that the sensor circuit 600 is able to perform auto-baseline tracking and correction. For instance, in the illustrated embodiment, the digital logic 638 will adjust the attenuation factor of the attenuators 610 and 616 in accordance with equation (1) so to maintain the output signal 628 within the desired range, as indicated by the high and low baseline thresholds.

Figure 7:
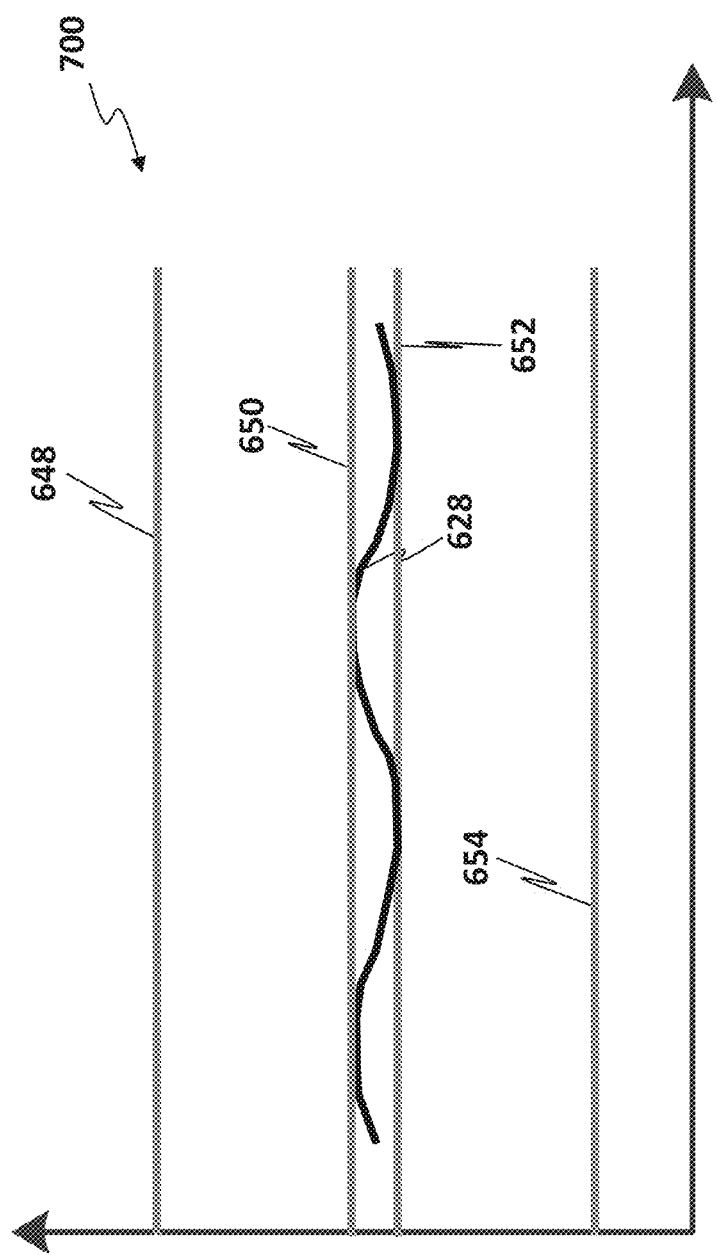
FIG. 7 is a plot of a baseline output voltage from the capacitive sensor of FIG. 6, in accordance with an embodiment of the disclosure.

FIG. 7 illustrates a plot 700 of output signal 628 in relation to the high and low baseline thresholds 650, 652 and the error and presence thresholds 648, 654. As illustrated, the output signal 628 illustrates a condition where no object is present at the sensor circuit 600 (see FIG. 6). Accordingly, the output signal 628 is based on the baseline input signal transmitted at each of transmitter 608, 512, 510 and 614. However, due to temperature and other environmental effects, the output signal 628 fluctuates. The comparator network 606, in particular comparators 632 and 634 will indicate when the output signal 628 crosses one of the high or low baseline thresholds 650, 652, respectively. If the output signal 628 crosses one of the high or low baseline thresholds 650, 652, then the digital logic 638 will adjust one or more signal conditioning parameters of one or more signal conditioning elements 644 and 646 in order to bring the output signal 628 back to being within the high or low baseline thresholds 650, 652. In doing so, the digital logic 638 may change an attenuation value of an attenuator, such as a digitally controlled attenuator 610 and 616; the digital logic 638 may change a capacitance of a variable capacitor; or the digital logic 638 may change the DAC settings so to change an output level of a DAC. For instance, if the output signal 628 drifts higher than the high baseline threshold 650, then the digital logic 638 may increase the attenuation of the signal conditioning parameters for one or more of the signal conditioning elements 644 and 646. Or, if the output signal 628 drifts lower than the low baseline threshold 652, then the digital logic 638 may decrease the attenuation of the signal conditioning parameters for one or more of the signal conditioning elements 644 and 646.

Returning to FIG. 6, the following is an exemplary description of the operation of the sensor circuit 600. A baseline input signal is input onto the transmitter 608, the transmitter 512, the transmitter 510 and the transmitter 614. The illustrated embodiment performs a differential measurement at the amplifier 522 based on the differential drive signal from transmitters 510, 512. Accordingly, two of the four transmitters, specifically, transmitters 512 and 614 are arranged as inverters so to invert a phase of the baseline input signal, while the other two transmitters 514 and 608 are arranged as amplifiers or a buffer in order to maintain the same timing as the signal from transmitters 512 and 614. Transmitter 608 transmits the baseline input signal onto the compensation path 602; transmitter 512 inverts the phase of the baseline input signal and transmits it onto the negative input path 524 of the electrode arrangement 550 (see FIG. 5); transmitter 510 transmits the baseline input signal onto the positive input path 526 of the electrode arrangement 550; and transmitter 614 inverts the phase of the baseline input signal and transmits it onto the compensation path 604.

The baseline input signal affected by the negative input path 524 (see FIG. 5) of the electrode arrangement 550 is combined with the baseline input signal affected or conditioned by the signal conditioning elements 644 of the compensation path 602 and the resulting signal is input into the negative input 622 of the amplifier 522. The baseline input signal affected by the positive input path 526 (see FIG.

5) of the electrode arrangement 550 is combined with the baseline input signal affected or conditioned by the signal conditioning elements 646 of the compensation path 604 and the resulting signal is input into the positive input 626 of the amplifier 522. The amplifier 522 then performs a differential measurement between the signals input on the negative input 622 and the positive input 626 in order to obtain the output signal 628.

While the foregoing describes circuitry for a differential drive and a differential measurement embodiment, in other embodiments, the circuit may be adapted for single end drive and/or a single end measurement. For example, if single end drive is used, the transmitter 512 which provides an opposite phase transmit signal may be omitted. Furthermore, if single end measurement is used, circuitry for providing a negative input path 622 to the amplifier 522 may be omitted.

The output signal 628 is then provided to the comparator network 606, which in the illustrated embodiment, includes the four comparators 630, 632, 634 and 636. The comparators 630 and 636 compare the output signal 628 to an error and presence thresholds 648, 654, respectively. The comparator 636 determines whether the object, such as a fingerprint, is present at the sensor circuit 600, and the comparator 630 determines whether an error has occurred in the sensor circuit 600. The comparators 632 and 634 compare the output signal 628 against high and low baseline thresholds 650, 652, respectively, in order to determine whether output signal 628 has crossed either of the high or low baseline thresholds 650, 652.

The output of the comparator network 606 is provided to the digital logic 638. In certain embodiments, the digital logic 638 will indicate the presence of the object when the presence threshold 654 is exceeded and indicate the occurrence of an error when the error threshold 648 is exceeded. Further, the digital logic 638 will adjust one or more signal conditioning parameters of one or more signal conditioning elements 644 and 646 of one or more of compensation paths 602 or 604 when the output signal 628 exceeds one of the high or low baseline thresholds 650, 652 input into the comparators 632 and 634, respectively. In this manner, the sensor circuit 600 is able to provide finger presence detection functionality with auto-baseline tracking to compensate for temperature and other environmental effects degrading the measurement of the input baseline signal by the electrode arrangement 550.

Figure 8:
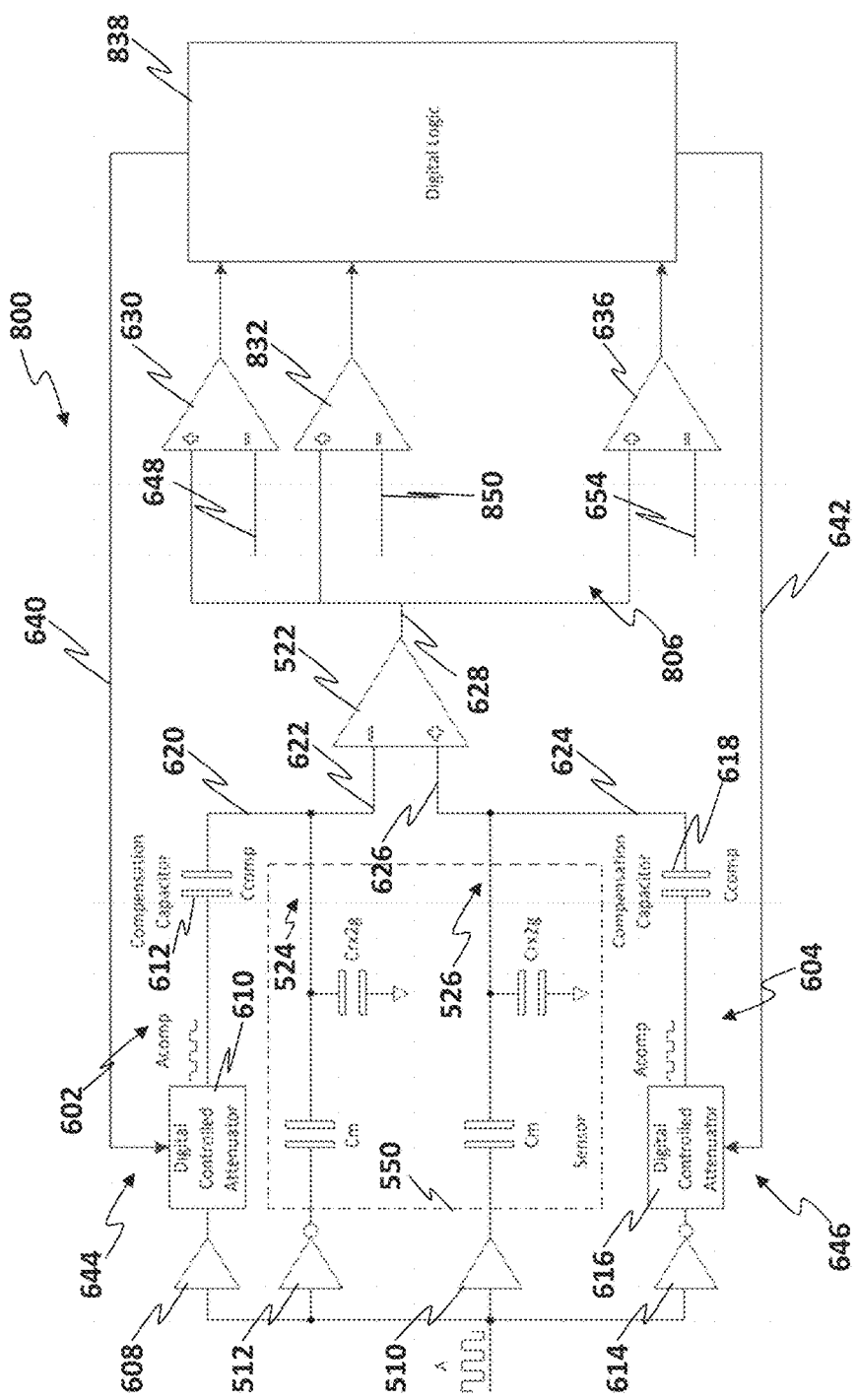
FIG. 8 is a schematic view of a capacitive sensor with auto-baseline tracking, in accordance with an embodiment of the disclosure.

FIG. 8 illustrates sensor circuit 800, which operates similarly to sensor circuit 600 (see FIG. 6). However, sensor circuit 800 includes comparator network 806, which is different from comparator network 806 in that the comparator 634 is not needed for sensor circuit 800. In this embodiment, digital logic 838 is configured to control signal conditioning parameters of the signal conditioning elements 644 and 646 such that the output signal 628 tracks a single baseline threshold 850 input into comparator 832. Accordingly, whenever the comparator 832 indicates that the output signal 628 crosses the baseline threshold 850 input onto the negative input of the comparator 832, the digital logic 838 will track a magnitude and direction of the output signal difference from the baseline threshold 850. The digital logic 838 will then make appropriate adjustments to the signal conditioning parameters of the signal conditioning elements 644 and 646 in order to compensate for the magnitude and direction of the output signal 628 to bring it closer to the baseline threshold 850. For instance, if the output signal 628 drifts higher than the baseline threshold 850, then the digital logic 838 may increase the attenuation of the signal conditioning parameters for one or more of the signal conditioning elements 644 and 646. Or, if the output signal 628 drifts lower than the baseline threshold 850, then the digital logic 838 may decrease the attenuation of the signal conditioning parameters for one or more of the signal conditioning elements 644 and 646.

Figure 9:
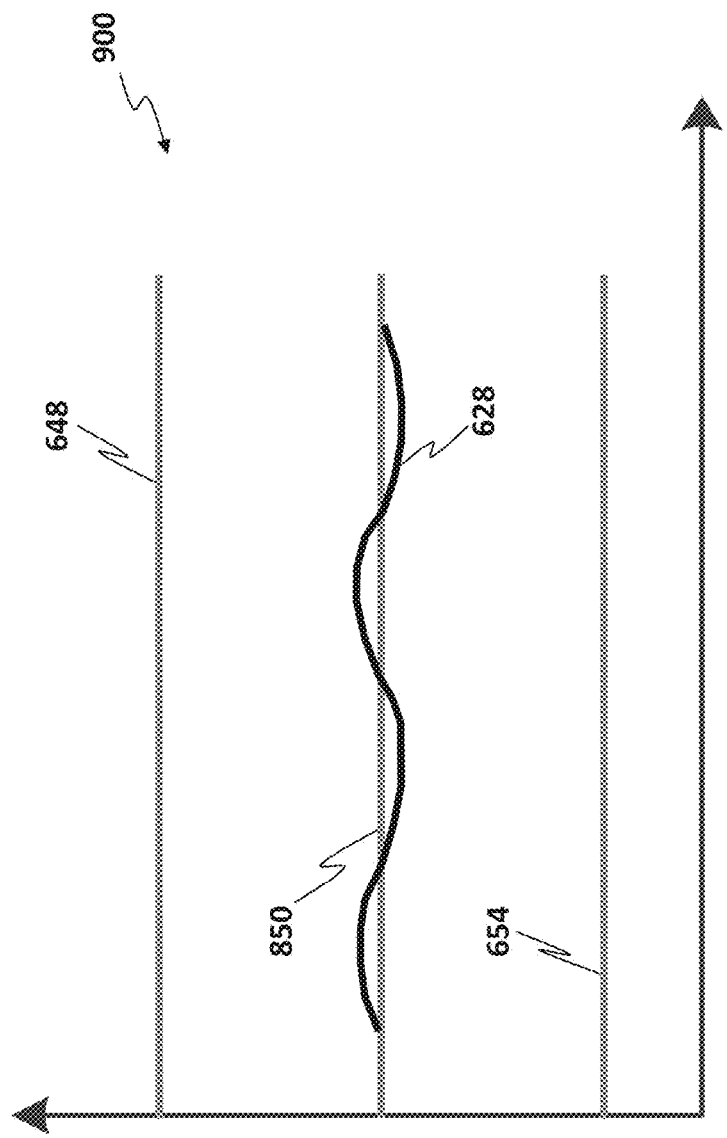
FIG. 9 is a plot of a baseline output voltage from the capacitive sensor of FIG. 8, in accordance with an embodiment of the disclosure.

FIG. 9 illustrates plot 900 showing the output signal 628 in reference to the single baseline threshold 850 and the error and presence thresholds 648, 654. The error and presence thresholds 648, 654 function in the same manner as discussed in reference to FIGS. 6 and 7. As illustrated, the output signal 628 shows a condition where no input object is present at a sensing area of the sensor circuit 800 (see FIG. 8). Accordingly, the output signal 628 is based on the baseline input signal transmitted at each of transmitter 608, 512, 510 and 614. However, due to temperature and other environmental effects, the output signal 628 fluctuates. The comparator network 806, in particular comparator 832, will indicate a magnitude and direction of the output signal 628 in reference to the baseline threshold 850. The digital logic 838 will adjust one or more signal conditioning parameters of one or more signal conditioning elements 644 and 646 in order to bring the output signal 628 back to the baseline threshold 850. For instance, the digital logic 838 may change an attenuation value of an attenuator, such as a digitally controlled attenuator; the digital logic 838 may change a capacitance of a variable capacitor; or the digital logic 838 may change the DAC settings so to change an output level of a DAC.

Figure 10:
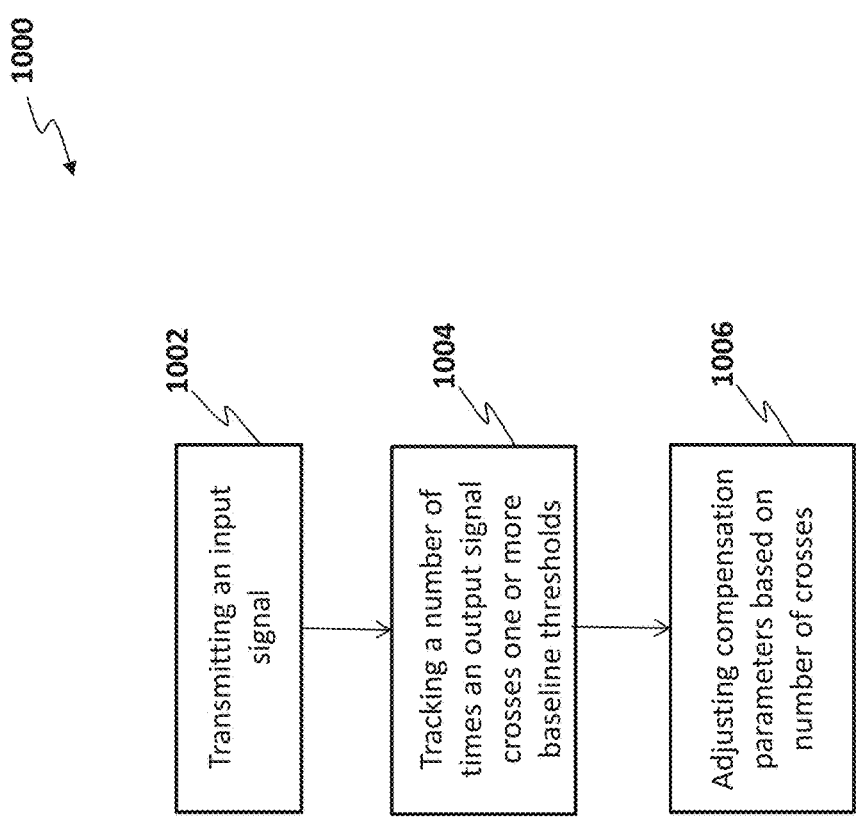
FIG. 10 is a flow diagram for a method of operating a capacitive sensor with auto-baseline tracking, in accordance with an embodiment of the disclosure.

FIG. 10 illustrates a flow chart 1000 providing a method of providing finger presence detection functionality with auto-baseline tracking. At step 1002 a baseline input signal is input into a finger presence detection sensor, such as sensor circuit 600 or sensor circuit 800 (see FIGS. 6 and 8). At step 1004, a comparator network 606, 806 will track an output signal 628 against certain threshold values. And, at step 1006, a control circuit, such as digital logic 638, 838, of the sensor circuit 600, 800 will adjust one or more signal conditioning parameters of one or more signal conditioning elements 644, 646 within the compensation paths 602, 604 in order for the output signal to closely track the baseline threshold.

Figure 11:
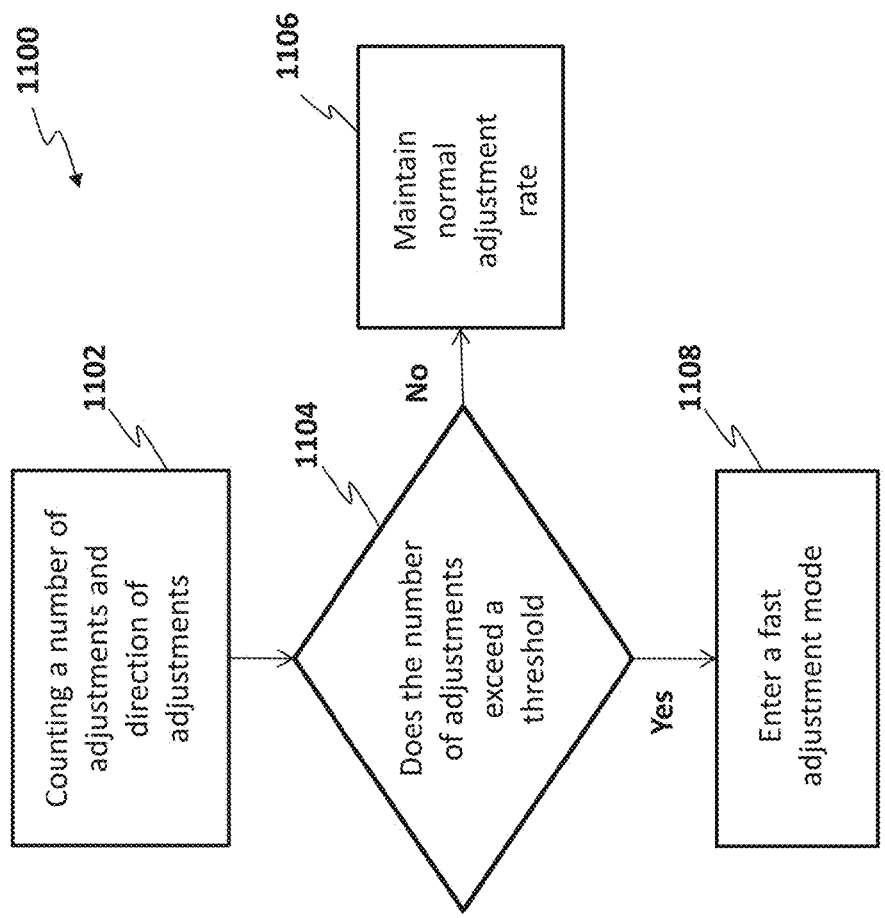
FIG. 11 is a flow diagram for a method of adjusting a speed of the auto-baseline tracking of FIG. 10, in accordance with an embodiment of the disclosure.

FIG. 11 illustrates a flow chart 1100 for having the digital logic 638, 838 (see FIGS. 6 and 8) or other control circuit enter a fast adjustment mode. The fast adjustment mode allows the digital logic 638, 838 to make greater changes to the signal conditioning parameters so to have a greater effect on a level of the output signal 628. Accordingly, if the finer adjustments of the signal conditioning parameters are not fast enough to bring an output signal heavily affected by temperature or other environmental effects back closer to the desired threshold, the digital logic 638, 838 can make larger adjustments to the signal conditioning parameters.

At step 1102, the digital logic 638, 838 (see FIGS. 6 and 8) counts a number of adjustments and direction of the adjustments made by the digital logic 638, 838. At step 1104, the digital logic 638, 838 determines whether a number of successive adjustments in a same direction exceed a threshold count. If the number of successive adjustments in the same direction do not exceed the threshold count, then, at step 1106, the digital logic 638, 838 maintains normal operation. However, if the number and direction of adjustments exceeds the threshold value, then, at step 1108, the digital logic 638, 838 will enter the fast adjustment mode such that it can appropriately adjust the quickly degrading output signal 628. For instance, the digital logic 638, 838 may be configured to make larger adjustments to the signal conditioning parameters, e.g., by incrementing a signal conditioning parameter value by a larger amount, while in the fast adjustment mode.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A processing system for automatically tracking a baseline input into a biometric sensor, the processing system comprising:

an amplifier having at least one input terminal and an output terminal for producing an output signal based on at least one input signal received by the at least one input terminal;

at least one signal conditioning element coupled to the at least one input terminal of the amplifier and configured to condition at least one compensation signal;

a control circuit providing a feedback signal to the at least one signal conditioning element that adjusts one or more signal conditioning parameters of the at least one signal conditioning element based on the output signal of the amplifier;

a first comparator configured to compare the output signal of the amplifier to a first baseline threshold; and a second comparator configured to compare the output signal of the amplifier to a second baseline threshold, wherein the at least one input signal received by the at least one input terminal includes a combination of the at least one compensation signal and a signal from a first set of one or more receiver electrodes of the biometric sensor, wherein the feedback signal is derived from the output signal of the amplifier, wherein the control circuit adjusts the one or more signal conditioning parameters when the output signal exceeds the first baseline threshold and when the output signal exceeds the second baseline threshold, wherein the first baseline threshold is a high threshold and the second baseline threshold is a low threshold, wherein the control circuit adjusts the one or more signal conditioning parameters such that they lower the output signal of the amplifier when the first comparator indicates that the output signal has exceeded the high threshold, and wherein the control circuit adjusts the one or more signal conditioning parameters such that they raise the output signal of the amplifier when the first comparator indicates that the output signal has exceeded the low threshold.

2. The processing system of claim 1, wherein the at least one signal conditioning element includes a compensation capacitor and the signal conditioning parameters include an amplitude of the compensation signal.

3. The processing system of claim 2, wherein the control circuit comprises digital logic, wherein the at least one conditioning element further includes a digital controlled attenuator and the signal conditioning parameters further include an attenuation factor of the digital controlled attenuator, and wherein the digital logic controls the digital controlled attenuator to adjust an amplitude of the compensation signal.

4. The processing system of claim 2, wherein the control circuit comprises digital logic, wherein the at least one conditioning element further includes a digital-to-analog converter (DAC) and the signal conditioning parameters further include DAC settings, and wherein the digital logic controls the DAC settings.

5. The processing system of claim 2, wherein the control circuit comprises digital logic, wherein the compensation capacitor is a variable capacitor and the signal conditioning parameters further include a capacitance of the variable capacitor, and wherein the digital logic controls the capacitance of the variable capacitor.

6. The processing system of claim 3, wherein the compensation capacitor is a variable capacitor and the signal conditioning parameters further include a capacitance of the variable capacitor, and
wherein the digital logic controls the capacitance of the variable capacitor.

7. The processing system of claim 1, wherein the at least one input terminal of the amplifier includes a first input terminal and a second input terminal, the at least one signal conditioning element includes a first signal conditioning element and a second signal conditioning element with the first signal conditioning element configured to condition a first compensation signal and the second signal conditioning element configured to condition a second compensation signal that is the same as the first compensation signal but with opposite phase,
wherein the first signal conditioning element is coupled to the first input terminal of the amplifier and the second signal conditioning element is coupled to the second input terminal of the amplifier,
wherein the first input signal received by the first input terminal is a combination of the first compensation signal and the signal from the first set of one or more receiver electrodes of the sensor,
wherein the second input signal received by the second input terminal is a combination of the second compensation signal and a signal from a second set of one or more receiver electrodes of the sensor, and
wherein the output signal from the output terminal of the amplifier is based on the first input signal and the second input signal.

8. The processing system of claim 1, wherein the biometric sensor is a fingerprint sensor.

9. The processing system of claim 1, wherein at least one of the first comparator and the second comparator are configured to compare the output signal of the amplifier to at least a biometric object presence threshold, and
wherein when the output signal of the amplifier exceeds the biometric object presence threshold, the control logic indicates a presence of a biometric object at the biometric sensor.

10. A processing system for automatically tracking a baseline input into a biometric sensor, the processing system comprising:
an amplifier having at least one input terminal and an output terminal for producing an output signal based on at least one input signal received by the at least one input terminal;
at least one signal conditioning element coupled to the at least one input terminal of the amplifier and configured to condition at least one compensation signal; and
a control circuit providing a feedback signal to the at least one signal conditioning element that adjusts one or more signal conditioning parameters of the at least one signal conditioning element based on the output signal of the amplifier,
wherein the at least one input signal received by the at least one input terminal includes a combination of the at least one compensation signal and a signal from a first set of one or more receiver electrodes of the biometric sensor,
wherein the feedback signal is derived from the output signal of the amplifier,
wherein the control circuit is configured to count a number of successive adjustments to the one or more signal conditioning parameters occurring in a same direction, and
wherein the control circuit is configured to initiate a higher adjustment rate to the one or more signal conditioning parameters in response to the count passing a threshold count.

11. An electronic system for capacitive sensing, the electronic system comprising:
a capacitive sensor configured to capacitively sense an input object in proximity to a plurality of electrodes, wherein the plurality of electrodes comprises: a first set of one or more transmitter electrodes capacitively coupled to a first set of one or more receiver electrodes and forming a first signal path for a first sensor input signal; and
a second set of one or more transmitter electrodes capacitively coupled to a second set of one or more receiver electrodes and forming a second signal path for a second sensor input signal with opposite phase to the first sensor input signal;
a processor configured for automatically tracking a baseline value of the first input signal and the second input signal, the processor comprising:
a first compensation path including a first signal conditioning element, wherein the first compensation path transmits a first compensation signal; and
a second compensation path including a second signal conditioning element, wherein the second compensation path transmits a second compensation signal with opposite phase to the first compensation signal;
an amplifier including a first input terminal, a second input terminal and an output terminal, wherein the first sensor input signal and the first compensation signal are combined into a first amplifier input signal on the first input terminal and the second sensor input signal and the second compensation signal are combined into a second amplifier input signal on the second input terminal, and the output terminal produces an output signal based on the first amplifier input signal and the second amplifier input signal;
a control circuit providing a feedback signal to the first signal conditioning element and the second signal conditioning element and configured to adjust one or more signal conditioning parameters of the first signal conditioning element and the second signal conditioning element;
a first comparator configured to compare the output signal to a first baseline threshold; and
a second comparator configured to compare the output signal to a second baseline threshold,
wherein the feedback signal is derived from the output signal of the amplifier,
wherein the control circuit adjusts the one or more signal conditioning parameters whenever the output signal exceeds either the first baseline threshold or the second baseline threshold,
wherein the first baseline threshold is a high threshold and the second baseline threshold is a low threshold,
wherein the control circuit adjusts the one or more signal conditioning parameters such that they lower the output signal when the first comparator indicates that the output signal has exceeded the high threshold, and
wherein the control circuit adjusts the one or more signal conditioning parameters such that they raise the output signal when the first comparator indicates that the output signal has exceeded the low threshold.

12. The electronic system of claim 11, further comprising at least one comparator configured to compare the output signal to a baseline threshold, wherein the control circuit adjusts the one or more signal conditioning parameters in a first direction when the output signal is higher than the baseline threshold and adjusts the one or more signal conditioning parameters in a second direction when the output signal is lower than the baseline threshold.

13. The electronic system of claim 11, wherein the first signal conditioning element includes a first compensation capacitor, the second signal conditioning element includes a second compensation capacitor and the one or more signal conditioning parameters include a first phase of the first compensation capacitor and a second phase of the second compensation capacitor.

* * * * *